(12) United States Patent
Hackert et al.

(10) Patent No.: US 10,585,408 B2
(45) Date of Patent: Mar. 10, 2020

(54) HOUSEHOLD APPLIANCE

(71) Applicant: Vorwerk & Co. Interholding GmbH, Wuppertal (DE)

(72) Inventors: Georg Hackert, Bochum (DE); Martin Helmich, Duisburg (DE); Lorenz Hillen, Wuppertal (DE); Christian Holz, Dortmund (DE); Gerhard Isenberg, Cologne (DE); Hendrik Koetz, Wetter (DE); Andrej Mosebach, Bochum (DE); Roman Ortmann, Huerth (DE); Robin Dulinski, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 36 days.

(21) Appl. No.: 16/008,169

(22) Filed: Jun. 14, 2018

(65) Prior Publication Data

US 2018/0364661 A1    Dec. 20, 2018

(30) Foreign Application Priority Data

Jun. 16, 2017    (DE) .......................... 10 2017 113 280

(51) Int. Cl.
| | |
|---|---|
| G05B 15/02 | (2006.01) |
| A47J 36/32 | (2006.01) |
| A47L 11/40 | (2006.01) |
| A47L 9/28 | (2006.01) |
| A47J 43/07 | (2006.01) |

(52) U.S. Cl.
CPC .............. *G05B 15/02* (2013.01); *A47J 36/32* (2013.01); *A47J 36/321* (2018.08); *A47J 43/07* (2013.01); *A47L 9/28* (2013.01); *A47L 11/4011* (2013.01); *A47L 2201/00* (2013.01); *A47L 2201/04* (2013.01)

(58) Field of Classification Search
None
See application file for complete search history.

(56) References Cited

U.S. PATENT DOCUMENTS

| | | | |
|---|---|---|---|
| 9,717,387 B1* | 8/2017 | Szatmary | A47L 9/009 |
| 2011/0071674 A1* | 3/2011 | Jeon | B25J 13/00 |
| | | | 700/246 |
| 2013/0116826 A1* | 5/2013 | Kim | G05D 1/0246 |
| | | | 700/259 |
| 2014/0218517 A1* | 8/2014 | Kim | H04L 12/2818 |
| | | | 348/143 |
| 2014/0337631 A1 | 11/2014 | Greive | |

(Continued)

FOREIGN PATENT DOCUMENTS

| | | |
|---|---|---|
| EP | 2 801 928 A1 | 11/2014 |
| WO | 2014/111204 A2 | 7/2014 |

*Primary Examiner* — Ramesh B Patel
(74) *Attorney, Agent, or Firm* — Collard & Roe, P.C.

(57) ABSTRACT

A household appliance in the form of a food processor has a controller that controls the preparation of a meal according to a sequence of prescribed steps that includes comminuting, mixing or heating the meal or ingredients. The controller is designed and set up to output a control command for controlling an external cleaning device depending on a progress of the sequence of steps. The control command to the external device includes a cleaning instruction for the external device to effect cleaning in an area where the household appliance is located.

8 Claims, 2 Drawing Sheets

(56) References Cited

U.S. PATENT DOCUMENTS

| | | | |
|---|---|---|---|
| 2015/0173578 A1* | 6/2015 | Kim | A47L 9/2894 |
| | | | 15/319 |
| 2015/0215443 A1* | 7/2015 | Heo | H04M 1/0202 |
| | | | 455/556.1 |
| 2016/0366481 A1* | 12/2016 | Lim | H04N 5/4403 |
| 2017/0242412 A1* | 8/2017 | Kim | G05B 15/02 |
| 2018/0360285 A1* | 12/2018 | Erkek | A47L 9/28 |
| 2018/0373242 A1* | 12/2018 | Han | A47L 9/009 |

* cited by examiner

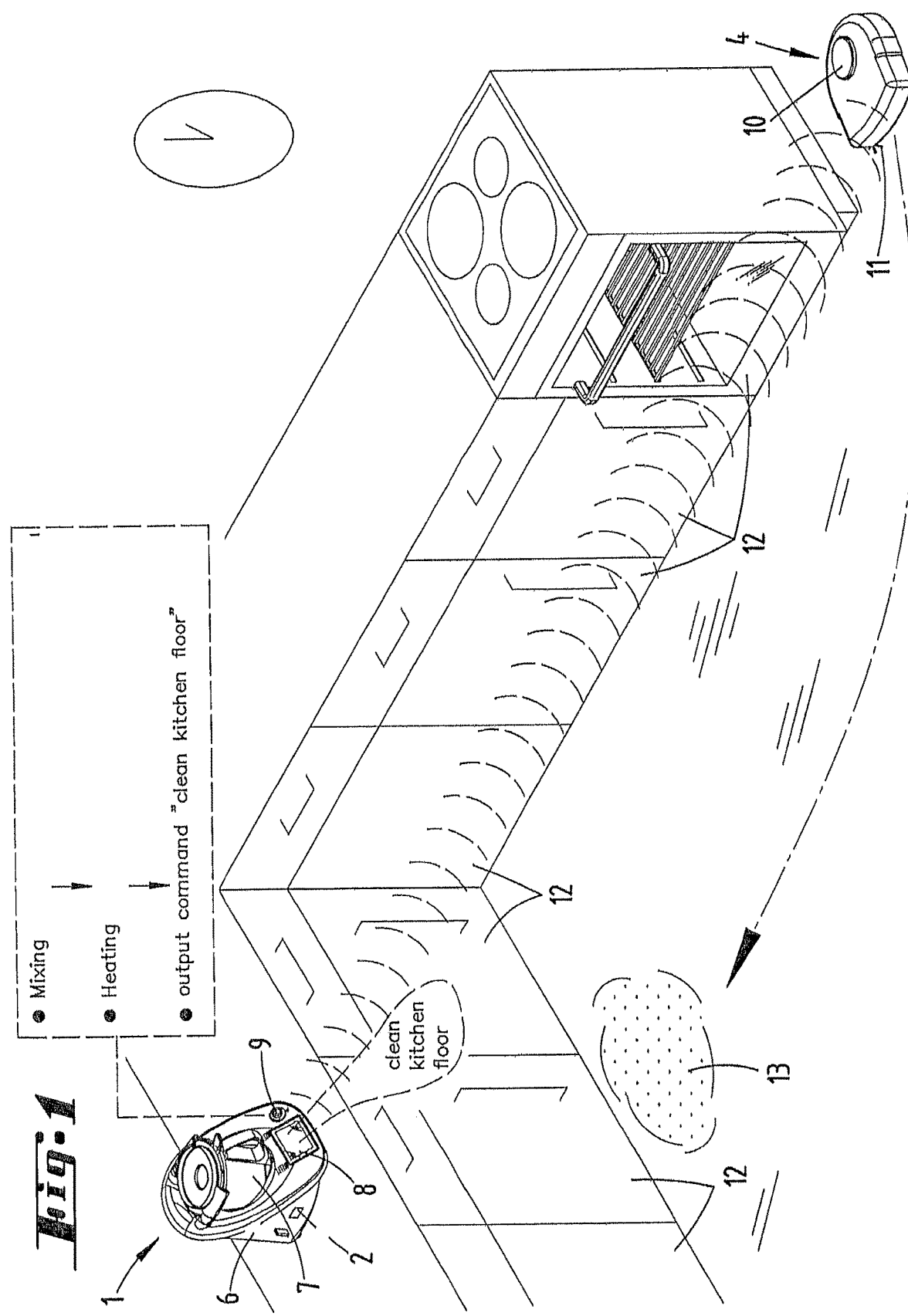

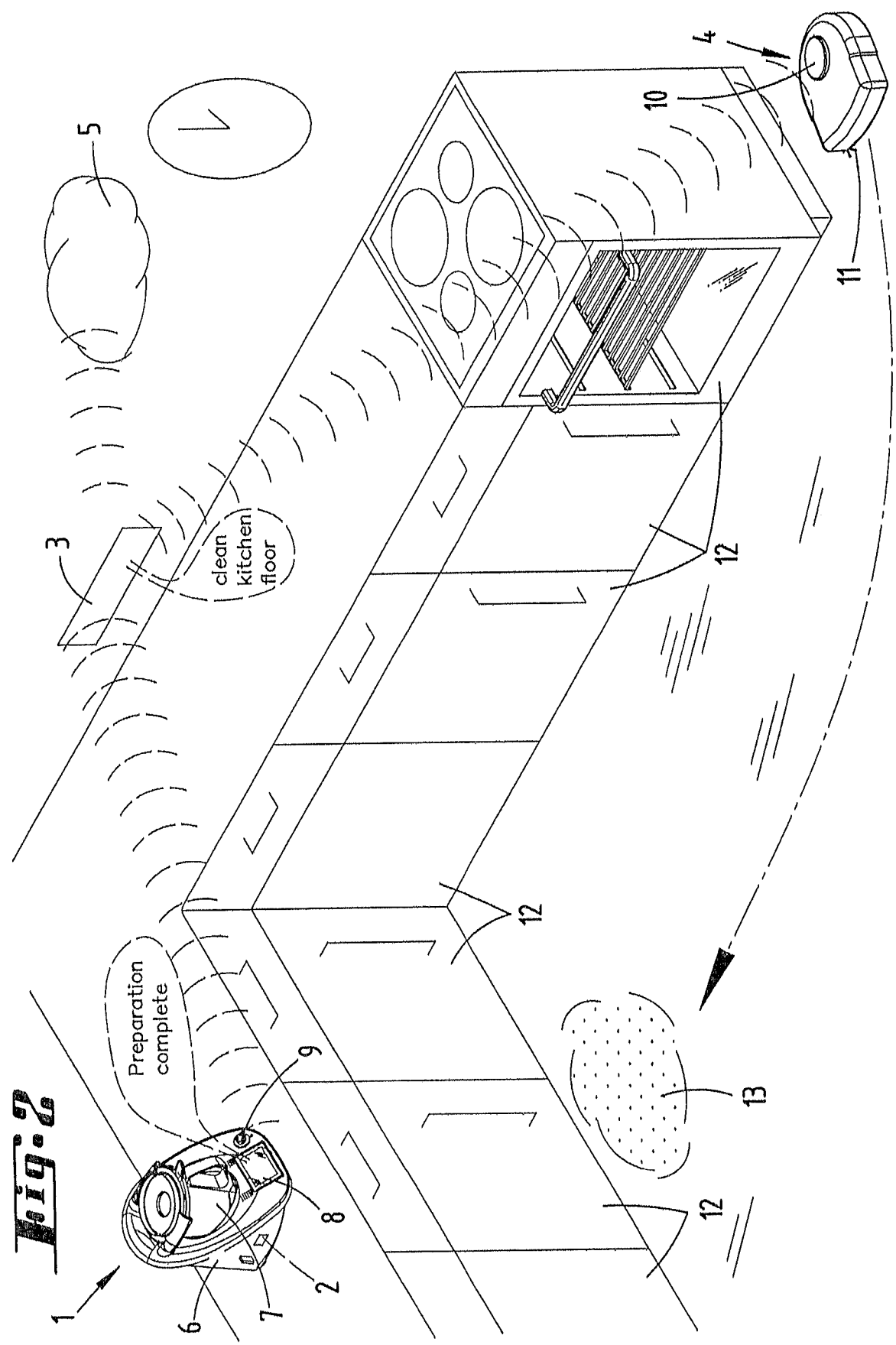

HOUSEHOLD APPLIANCE

CROSS REFERENCE TO RELATED APPLICATIONS

Applicant claims priority under 35 U.S.C. § 119 of German Application No. 10 2017 113 280.5 filed Jun. 16, 2017, the disclosure of which is incorporated by reference.

BACKGROUND OF THE INVENTION

1. Field of the Invention

The invention relates to a household appliance, which has a controller for controlling the preparation of a meal according to a sequence of prescribed steps.

In addition, the invention relates to a system comprised of a household appliance, which is designed for preparing a meal according to a sequence of prescribed steps, and an external device, in particular a cleaning device.

Further, the invention relates to a method for operating a household appliance, wherein a meal is prepared according to a sequence of prescribed steps.

2. Description of the Related Art

Household appliances for preparing meals are sufficiently known in prior art. Apart from mechanically processing foods, for example by means of an agitator or cutter, the latter often also make it possible to cook the food by means of a heater. Cooking recipes are usually prescribed for preparing a meal, and involve several sequential steps. In order to allow the user of the household appliance to prepare a meal according to a cooking recipe, it is also known to store recipe data or corresponding sequences of steps in a data memory of the household appliance, or alternatively in an external data memory designed separately from the household appliance.

For example, known from publication EP 2 801 928 A1 (also published as US 2014/0337631 A1) as well as from WO 2014/111204 A2 is a respective household appliance, which performs chronologically sequential preparation steps according to a recipe stored in a mobile data memory, wherein the preparation steps are distinguished by varying process parameters, for example processing temperature, agitator speed or processing step duration.

SUMMARY OF THE INVENTION

Proceeding from the mentioned prior art, the object of the invention is to further develop a household appliance in such a way that it provides added value to the user, in particular in terms of networked operation with other devices of the user.

In order to achieve the aforementioned object, a household appliance is proposed, whose controller is designed and set up to output at least one control command for controlling at least one external device depending on the progress of a sequence of steps.

According to the invention, the operation of an external device can thus be controlled by the household appliance, specifically in such a way that the operation of one or several external devices depends on the progress of the sequence of steps for the household appliance. The control command can be incorporated as a step into the sequence of prescribed steps. Therefore, an external device can be controlled depending on the progress of a recipe execution. As a result, the external device operates at the start of, during and/or after household appliance operation or recipe preparation. The household appliance and external device are thus combined in terms of their operation, wherein device operation depends on household appliance operation. For example, the external household appliance can be an electric motor-operated food processor, an oven, a fruit juice extractor, a mixer, a stove or even some other device, such as a cleaning device or the like. The control command is preferably transmitted between the controller and external device within the framework of wireless communication, for example via WLAN, Bluetooth, ZigBee or other wireless communication methods. Of course, hardwired communication is possible as an alternative, for example via Power-LAN. Household appliances on the one hand include multifunctional household appliances, for example which can cook, comminute, mix or perform other steps, but on the other hand other kitchen appliances as well, such as baking ovens or microwaves, provided the latter also make it possible to prepare a meal according to a sequence of prescribed steps using a controller. The steps can here relate to various heating stages, ventilation settings and/or a grilling function operation, for example.

The external device is preferably registered to the household appliance or its controller and/or vice versa. In particular, the controller of the household appliance has a device identification of the device to be controlled, which preferably is transmitted to the external device with the control command. In particular, it can be provided that, when registering the device to the household appliance, the device type and/or device location also be transmitted in addition to the device identification.

In addition, it is proposed that the control command contain an instruction for the external device to effect cleaning in the area where the household appliance is located. In this embodiment, the external device is a cleaning device, in particular a self-propelled cleaning device, which can move to the household appliance location without any actions by a user. In particular, the device can be a vacuuming robot, wiping robot or a combination of these devices. In addition, however, the device can also be a dryer, a ventilator and/or an air purifier. In particular, outputting the control command is a step taken by the household appliance, which is integrated into the sequence of prescribed steps. If the household appliance then performs the sequence of prescribed steps in the usual manner so as to prepare a meal, the control command is automatically output when it is next up in the sequence of steps. A cleaning mode of an autonomous cleaning device can thus be automatically controlled by the household appliance. As a result, a cleaning of the household appliance location is initiated at the beginning of, during and/or after use of the household device. In addition to the ingredients and preparation steps, a control command is also stored in each recipe, i.e., each sequence of prescribed steps, of the household appliance, which contains the device identification of the cleaning device to be controlled and determines what kind of cleaning is necessary and/or how the cleaning device to be controlled can be addressed.

An embodiment can provide that the controller of the household appliance be designed and set up, depending on the progress of the steps, to output a control command for controlling a cleaning device or an image acquisition means for acquiring a cleaning status of the environment of the household appliance. In particular, the control command can involve an image acquisition means for acquiring an image of the environment of the household device at the beginning of, during or upon completion of a step of the household appliance. The image acquisition means can either be an independent means of the household appliance, a separately designed external device, for example allocated to a separate, external sequence controller, which [word missing] a means of a cleaning device meant to clean the household appliance location. The image acquisition means is controlled by the control command so as to acquire the extent to which the household appliance environment has been contaminated as the sequence of household appliance steps begins, and also later during the sequence of steps. By comparing the images, the scope, type and/or location of the contamination can be inferred, so that the household appliance control command can be used to specifically control an external device, namely a cleaning device, in such a way as to eliminate the contamination. The software that processes the images of the image acquisition means can either be allocated to a controller of the household appliance, a networked application of a network server and/or an external calculating means, wherein the comparison result is made available to the controller of the household appliance for outputting a control command for cleaning purposes. The image acquisition means can be an integrated component of the household appliance, but also be allocated to a separate, external sequence controller, or be arranged in the environment of the household appliance as a standalone accessory. Use can also be made of an image acquisition means for detecting contamination that has been integrated into the external device itself, i.e., preferably into a cleaning device, wherein the external device performs an inspection run in the environment of the household appliance, preferably in the area where the household appliance is located, at the beginning of, during and after completion of a controlled sequence of household appliance steps.

It is further proposed that the control command have information about an ingredient that is now included as the result of preceding steps. In this embodiment, the control command for the external device has information about recently used ingredients. This information can potentially not be contained in the control command, but rather in a file that is linked and/or retrieved with the control command. For example, the information about the ingredient provides an indication as to which cleaning type is especially successful if portions of this ingredient are spilled in the area where the household appliance is located, e.g., onto a floor. Depending on the above, an external cleaning device can determine measures advantageous for eliminating precisely this ingredient. The control command transmitted from the household appliance to the device thus does not prescribe a specific type of cleaning, but rather only provides an instruction that cleaning be performed in the area where the household appliance is located. Suitable measures are determined by the cleaning device itself as a function of the respective ingredient, and possibly the quantity thereof.

Also proposed by the invention apart from the household appliance described above is a system comprised of a household appliance and an external device, wherein the household appliance is designed to prepare a meal according to a sequence of prescribed steps, and wherein a controller of the household appliance and/or a controller configured separately from the household appliance is designed and set up to transmit a control command to the device depending on the progress of the sequence of steps, wherein the control command in particular includes an instruction that cleaning be performed in the area where the household appliance is located. In particular, the system can also be part of a central home automation system, in which other household appliances can potentially also be networked, for example electric motor-operated shutters, lighting equipment, audio-video systems, heaters, air conditioners and the like. The system has a central controller, which can be integrated into a device of the system, for example into the household appliance. In addition, however, the controller can also be a separately configured controller. The central controller is used for communication between the devices networked in the system, including the household appliance and device, in particular the household appliance and a cleaning device. If the devices in the system communicate wirelessly, the controller can be an access point of a WLAN network, for example. Otherwise, the features and advantages described above with respect to the household appliance also apply to the system according to the invention.

In addition, it is proposed that the separate controller of the system be set up to generate the control command and transmit it to the device. As an alternative, however, it can also be provided that the separate controller be set up to relay the control command generated by controller of the household appliance to the device. According to the first mentioned alternative, the separate controller generates the control command for the external device itself, and transmits the latter to the device. In the last mentioned alternative, the integrated controller in the household appliance generates the control command and initially transmits it to the central controller of the system. The central controller can then relay the control command to the device unchanged, or modify and/or supplement the latter.

It can further be provided that the system have an external memory, in particular a webserver, wherein the memory stores a sequence of steps for preparing a meal and/or a control command for the device. The integrated controller of the household appliance or central controller of the system can access this external memory and obtain information from it about generating the control command. For example, if a local controller of the household appliance is connected with the external memory, the household appliance can access it to query control commands for specific times in a sequence of prescribed steps. To this end, a control command can be linked with a corresponding file on the external memory. Likewise, a central controller of the system can obtain information from a household appliance as to which step in a sequence of several steps has currently been reached, whereupon the central controller transmits the current status of household appliance step implementation to the memory, and receives a control command corresponding thereto, which can in turn be transmitted to the device. In addition, it can be provided that the sequence of steps for preparing a meal be stored in the external memory. Before and/or during preparation, the household appliance accesses this external memory and the steps stored therein. If necessary, it can also be provided that the steps stored in the external memory be downloaded into a local controller of the household appliance, so that the household appliance does not have to rely on a functioning data communication with the external memory during preparation.

In addition, the invention proposes a method for operating a household appliance, wherein a meal is prepared according to a sequence of prescribed steps, wherein a control command for controlling an external device is generated and transmitted to the device depending on the progress of the sequence of steps. In particular, it is proposed that the control command transmit an instruction to the external device to effect cleaning in the area where the household appliance is located.

Information about an ingredient used in a step preceding the control command can also be transmitted to the external device. Furthermore, the control command can have an instruction for implementing a cleaning process, wherein cleaning involves wiping and/or vacuuming and/or drying and/or air purification. In particular, a type of cleaning can be controlled as a function of a processed ingredient.

As a consequence, the method according to the invention provides that an operating mode of a device, in particular an autonomous cleaning device, such as a vacuuming robot, wet cleaning robot, surface cleaning device or air purifier or the like, be controlled automatically by another device, namely a household appliance. In order to optimally implement the method, the household appliance and the device or several of these devices are acquired and registered with a controller, which can be a local controller of the household appliance or even a central, separate controller of the system. During registration, a device identification and advantageously also a device type and/or device location is registered for each of the devices involved. Communication with the controller can take place via WLAN, Bluetooth, ZigBee or other wireless radio technologies. Also possible is hardwired communication, for example via PowerLAN. The recipes, i.e., the sequences of prescribed steps for preparing a meal, are preferably stored locally in the household appliance, or in an external memory, for example a webserver with a recipe database. In addition to the ingredients and steps, each recipe can store information about what type of contamination can arise during preparation and/or what communication protocol the devices uses.

For example, a method according to the invention can provide that the external device clean the floor at the beginning of, during and/or at the end of a recipe execution by the household appliance. The device can be a vacuuming robot and/or wet cleaning robot, for example. The cleaning device is controlled according to the type of meal preparation contamination. The cleaning type, for example wiping, vacuuming, drying, as well as the position and/or size of the surface to be cleaned can be determined by the device. In particular, it can be provided that a cleaning device itself determine the exact position and/or size of the floor to be cleaned by having a sensor of the cleaning device detect the contamination. It can further be provided that a sequence of several cleaning steps of one or several devices be controlled depending on the type of meal preparation. In a sequence of steps, for example one followed to bake cookies, the cleaning device can first initiate cleaning through vacuuming, and then through wiping. In steps that involve roasting meals, and hence also using fat and/or oil, wet cleaning can be performed first. Before starting to clean with the cleaning device, a determination can first be made whether a person is present in the area where the household appliance is located. Depending thereupon, additional measures can then be planned, for example outputting an instruction to the person that cleaning will soon be taking place in the area where the appliance is located, and/or delaying the cleaning process or the like.

Another procedure can involve surface cleaning. For example, a surface cleaning device can be controlled for cleaning a kitchen counter at the beginning of, during and/or after the preparation of a meal. Depending on an ingredient used in a step, a specific cleaning agent can be used to achieve optimal cleaning. The surface cleaning device is controlled by a control command, which is integrated in the sequence of prescribed steps for the household appliance. This control command can contain an instruction to use a specific cleaning agent, so as to enable an optimal implementation of the cleaning step.

In another case involving the execution of a recipe where an odor is to be expected, for example while roasting meat or onions, a device designed as an air purifier, for example an extractor hood, can be activated at the beginning of the corresponding step, so that the odor can be eliminated or at least minimized. For example, the control command of the controller can contain instructions about a ventilator level, volume flow, type of air purification and/or elements for odor neutralization.

BRIEF DESCRIPTION OF THE DRAWINGS

The invention will be explained in more detail below based on exemplary embodiments. In the drawings:

FIG. 1 is a system comprised of a household appliance and external device according to a first embodiment; and FIG. 2 is a system comprised of a household appliance, an external device and a separately designed controller according to a second embodiment.

DETAILED DESCRIPTION OF THE PREFERRED EMBODIMENTS

FIG. 1 shows a first embodiment of the invention with a system comprised of a household appliance 1 and a device 4.

The household appliance is a conventional cooker-mixer, which is designed to prepare a meal based on a sequence of prescribed steps. The household appliance 1 has several preparation devices, for example an agitator and a heater. In addition, the household appliance 1 has a preparation vessel 7, in which ingredients can be introduced for preparation purposes. An internal controller 2 is integrated into the household appliance 1 to control the preparation devices based on the prescribed steps. The household appliance 1 further has a display 8, which serves to display information to the user, as well as a switch 9 for turning the household appliance 1 on and off, or confirming a message indicated on the display 8. The preparation vessel 7 is arranged on a base unit 6 of the household appliance 1, wherein an agitator (not depicted) protrudes into the preparation vessel 7 from below. The household appliance 1 also has a communication system (not depicted), for example which here is a WLAN communication module. The communication system is used to communicate with a corresponding communication system of the depicted device 4.

The device 4 is here a self-propelled cleaning robot, which has driven wheels (not depicted) and several cleaning elements 11, of which only one outwardly protruding side brush is visible on the figure. The self-propelled device 4 has a navigation and self-localization system, so that it can orient itself and move within the environment. The navigation and self-localization system includes a distance measuring instrument 10, which here is designed as a triangulation measuring instrument, for example. The distance measuring instrument 10 serves to measure a distance from objects 12 in the environment, here for example the cabinets in the kitchen shown. The measured data recorded by the distance measuring instrument 10 can be used to generate an area map, which contains the objects 12, the household appliance 1 and the device 4. The device 4 has a WLAN communication module for communicating with the household appliance 1.

In an embodiment, the household appliance 1 executes a program with prescribed steps while preparing a meal. For example, these steps can involve comminuting, mixing and heating meals and/or ingredients within the preparation vessel 7. In addition, the sequence of prescribed steps for preparing the meal contains a control command, here specifically "clean kitchen floor", which is output by the household appliance 1 in a specific chronological sequence to the other steps. For example, it is here provided that the control command be output at a time where the last ingredient is added to the preparation vessel 7. The control command "clean kitchen floor" is transmitted to the device 4 by the communication system, i.e., here via WLAN. The control command contains a device identification for the device 4, as well as the instruction to clean the floor in the area of the household appliance 1, and possibly information about the location of the household appliance 1. As an alternative, the device 4 can have an area map that notes the location of the household appliance 1, so that the device 4 already knows the location of the household appliance 1. The device 4 then moves according to the control command into the area where the household appliance 1 is located. Since the device 4 here involves a floor cleaning device, the device 4 moves forward in a floor area and below the household appliance 1. The device 4 can there vacuum or wipe up any dirt 13 that might be present.

It can additionally be provided that the household appliance 1 transmit information about the previously used ingredients to the device 4 with the control command, so that the device 4 can select a cleaning type and/or a cleaning agent with which the dirt 13 can be optimally eliminated. This embodiment is suited in particular for devices 4 that are combination devices, which are able to perform different types of cleaning, e.g., vacuuming and wet wiping.

FIG. 2 shows another exemplary embodiment of the invention with a system comprised of a household appliance 1, a device 4 and a controller 3 designed separately therefrom, e.g., which here is installed on a wall of the room. The controller 3 here further has a communication link to an external memory 5, here for example a webserver (cloud). The memory 5 could basically also be an internal memory of the communication network of the system depicted.

According to this embodiment, the household appliance 1 and device 4 communicate with each other via the separate controller 3, wherein a control command for cleaning a location of the household appliance 1 is generated by the controller 3 and transmitted to the device 4. Specifically, the procedure takes place in such a way that the household appliance 1 prepares a meal based on a sequence of prescribed steps. For example, the sequence of steps here involves a comminuting, heating and/or mixing of ingredients, as well as the control command "preparation complete" after preparation has ended. The control command "preparation complete" is transmitted via WLAN to the separate controller 3, and contains an instruction for the controller 3 to generate a control command for the device 4. To generate the control command, the controller 3 accesses the external memory 5, in which control commands for the device 4 are allocated to the instructions of the household appliance 1. A table and/or area map in the memory 5 can store additional information about the device 4 (or other devices 4 present in the environment). Based on the information, the external controller 3 can select a nearest operational device 4 that is advantageous for the respective task and situation, and transmit a corresponding control command to this device 4. As an alternative, it would of course also be possible for the controller 3 to relay a control command "clean kitchen floor" generated by the household appliance 1 to the device 4 unchanged. However, if the controller 3 happens to be a controller 3 of a more complex home automation system with a plurality of household appliances 1 and/or devices 4, it may be advantageous for the controller 3 to generate the control commands itself and transmit them to selected devices 4.

The central controller 3 of the system can basically also be a controller 2, 3 of a household appliance 1 and/or a device 4. While the controller 2, 3 is here integrated into one of the devices, it serves in like manner as a central controller 3, which has a communication link with the household appliance 1, the device 4 and if necessary an external memory 5 as well.

REFERENCE LIST

1 Household appliance
2 Controller
3 Controller
4 Device
5 Memory
6 Base device
7 Preparation vessel
8 Display
9 Switch
10 Distance measuring system
11 Cleaning element
12 Object
13 Dirt

What is claimed is:

1. A household appliance comprising:
a food processor and a controller connected to the food processor, the controller being configured for controlling the preparation of a meal by the food processor according to a sequence of prescribed steps that include at least one of comminuting, mixing or heating meals and/or ingredients, wherein the controller is designed and set up to output a control command that includes a cleaning instruction for controlling an external device to effect cleaning in an area where the household appliance is located depending on a progress of the sequence of prescribed steps.

2. The household appliance according to claim 1, wherein the control command has information about an ingredient that is contained in the sequence of prescribed steps.

3. A system comprising:
a household appliance in the form of a food processor which is designed to prepare a meal according to a sequence of prescribed steps that include comminuting, mixing or heating meals and/or ingredients,
an external device in the form of a cleaning device, and
a controller formed as part of the household appliance or configured separately from the household appliance, the controller being configured to transmit a control command to the external device depending on the progress of the sequence of steps, wherein the control command includes an instruction that cleaning be performed in an area where the household appliance is located.

4. The system according to claim 3, wherein the controller is a separate controller and is set up to generate the control command and transmit the control command to the external device and/or to relay a control command generated by the controller of the household appliance to the external device.

5. The system according to claim 3, further comprising an external memo which stores a sequence of steps for preparing the meal and/or a control command for the external device.

6. A method for operating a household appliance comprising the following steps:

preparing a meal using a food processor according to a sequence of prescribed steps that include comminuting, mixing or heating meals and/or ingredients, and which are controlled by a controller of the food processor, generating with the controller a control command for controlling an external device; and transmitting the control command to the external device depending on the progress of the sequence of prescribed steps, wherein the control command comprises an instruction to the external device to effect cleaning in an area where the household appliance is located.

7. The method according to claim 6, wherein information about an ingredient that was used in a step preceding the control command is transmitted to the external device during said step of transmitting.

8. The method according to claim 7, wherein the control command comprises instruction for implementing a cleaning process comprising at least one of wiping, vacuuming, drying and air purification, and wherein the type of cleaning is controlled as a function of the ingredient.

* * * * *